Nov. 28, 1933.  M. F. WUEBBEN ET AL  1,937,457
AUTOMOBILE JACK
Filed March 9, 1931  2 Sheets-Sheet 1
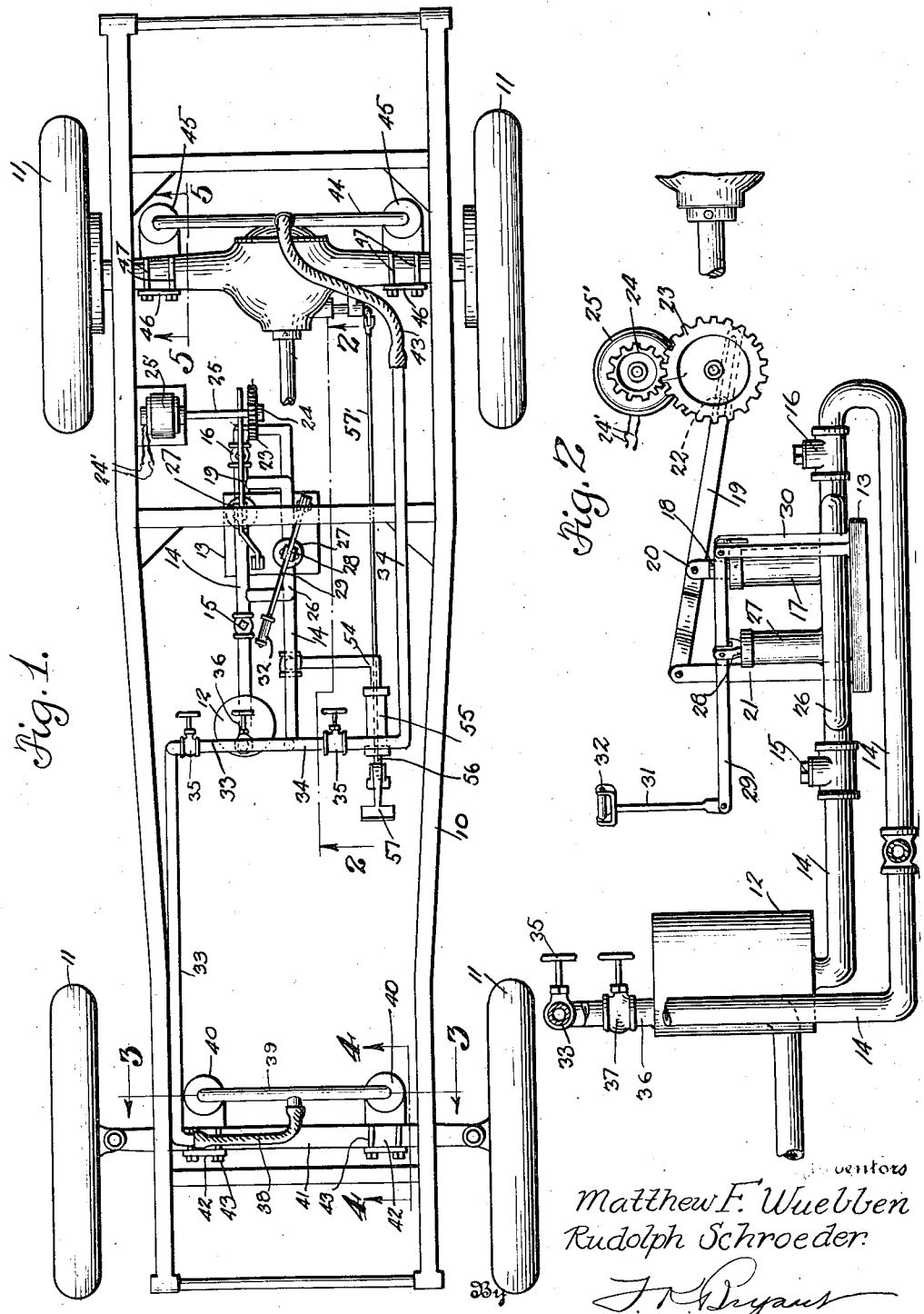
Inventors
Matthew F. Wuebben
Rudolph Schroeder Nov. 28, 1933.  M. F. WUEBBEN ET AL  1,937,457
AUTOMOBILE JACK
Filed March 9, 1931   2 Sheets-Sheet 2
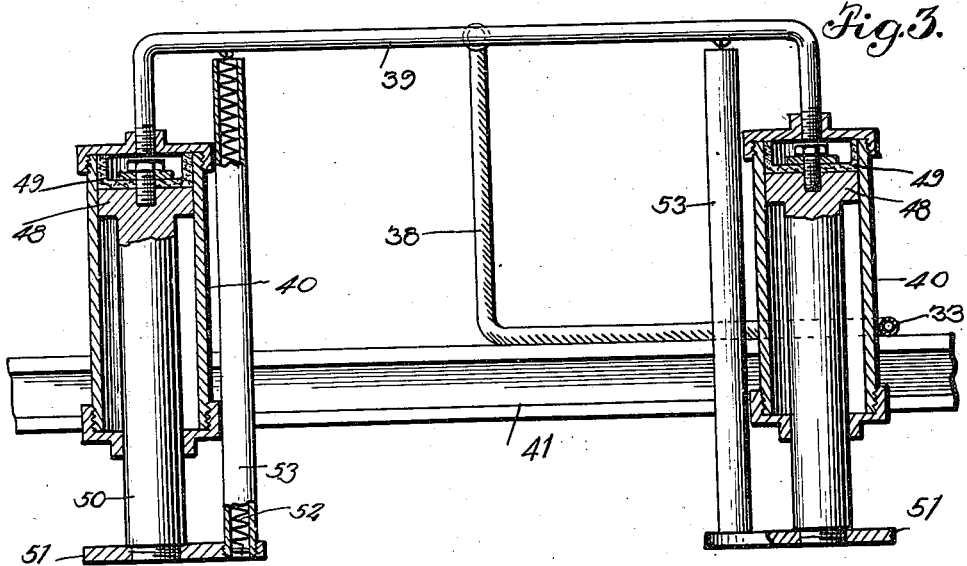
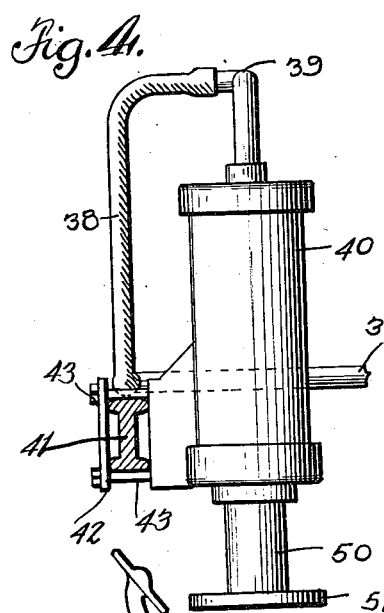
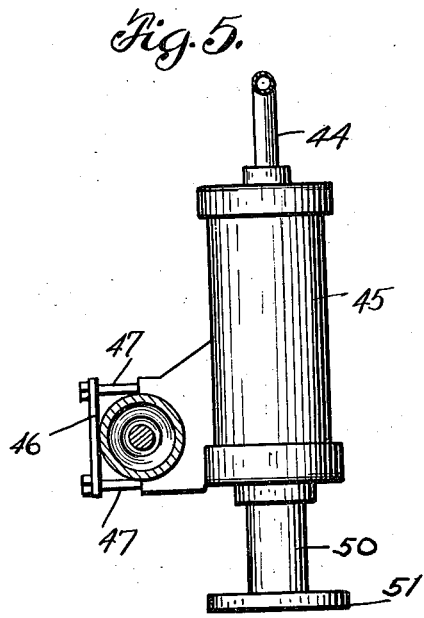
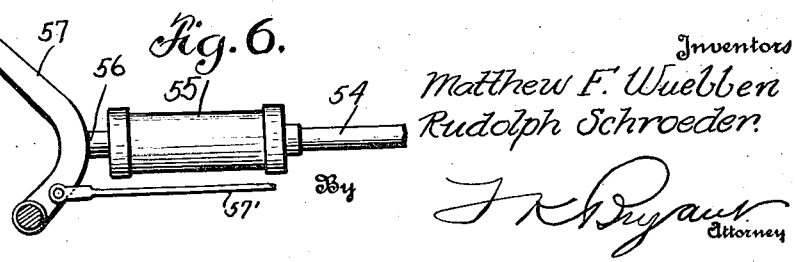
Inventors
Matthew F. Wuebben
Rudolph Schroeder Patented Nov. 28, 1933

1,937,457

UNITED STATES PATENT OFFICE 1,937,457

AUTOMOBILE JACK

Matthew F. Wuebben and Rudolph Schroeder, Wynot, Nebr.

Application March 9, 1931. Serial No. 521,296

4 Claims. (Cl. 180—82)

This invention relates to automobiles and has special reference to a hydraulic jack system for automotive vehicles.

One important object of the invention is to provide a novel and improved arrangement of jacks permanently and fixedly attached to an automobile whereby either or both ends of the vehicle may be lifted so as to raise the wheels at the lifted end or ends off the ground.

A second important object of the invention is to provide an improved arrangement of this class wherein the pumping up of the jacks may be accomplished either manually or by motor means.

A third important object of the invention is to provide, in connection with such a system, novel means whereby the motor clutch will be automatically released upon initiation of the pumping operation.

With the above and other objects in view, the invention consists in general of certain novel details of construction and combinations of parts hereinafter more fully described, illustrated in the accompanying drawings and specifically claimed.

In the accompanying drawings, like characters of reference indicate like parts in the several views, and:—

Figure 1 is a plan view of an automobile chassis showing the improved apparatus applied thereto;

Figure 2 is an enlarged section on the line 2—2 of Figure 1;

Figure 3 is an enlarged section on the line 3—3 of Figure 1;

Figure 4 is an enlarged section on the line 4—4 of Figure 1;

Figure 5 is an enlarged section on the line 5—5 of Figure 1; and

Figure 6 is an enlarged detail showing the clutch lever and clutch releasing cylinder.

In the embodiment of the invention here disclosed, there is shown a chassis frame 10 supported on wheels 11. Suitably supported by any ordinary means is a tank or reservoir 12 which preferably contains a non-freezing liquid such as a mixture of denatured alcohol, glycerine and castor oil. Adjacent the tank is a base or platform 13 and from the bottom of the tank a pipe 14 extends across this platform. This pipe has check valves 15 and 16 interposed in its length and connected to the pipe intermediate the valves 15 and 16 is a pump cylinder 17 provided with a plunger 18 forked at its upper end for reception of a lever 19 which is secured in the fork by a pivot pin 20. One end of this lever is pivoted to a standard 21 extending up from the base 13 while the other end is slotted to receive the crank pin 22 of a toothed crank wheel 23, meshing with the pinion 24 on the armature shaft 25 of the electric motor 25' having circuit wires 24'.

The valves 15 and 16 both open away from the tank 12 so that operation of the pump plunger 18 draws the liquid out of the tank upon upward movement of said plunger and forces it along the pipe 14 past the valve 16 upon downward movement of said plunger. A branch or by pass pipe 26 has its ends connected to the pipe 14 between the valves 15 and 16 and preferably on opposite sides of the cylinder 17. A pump cylinder 27 is connected to this branch pipe intermediate its ends and is provided with a plunger 28 pivoted to a lever 29 intermediate the ends of the latter. One end of the lever 29 is pivoted to a standard 30 extending upwardly from the base 13 while the other end of said lever has an operating rod 31 pivoted thereto and extending up through the floor of the automobile. A handle 32 is provided on the upper end of this rod so that the handle may be manipulated to operate the pump just described. It is not intended that the pumps 17 and 27 be used simultaneously, the pump 27 being constantly out of use and only employed when the pump 17 fails to operate which might be occasioned by motor trouble or the like. Thus either of the pumps may be operated at will. The pipe 14 extends from the valve 16 and terminates in branches 33 and 34 each having a shut off valve 35 therein. Also, between the valves 35 there is a branch pipe 36 leading from the branch 33 to the top of the tank 12 and having a valve 37 therein. One branch 33 is connected by a flexible tube 38 to a header 39 leading to the upper ends of jack cylinders 40. These cylinders are secured to the front axle 41 by plates 42 and bolts 43. Similarly, the branch 34 is connected through a flexible tube 43 and a header 44 to jack cylinders 45 secured to the rear axle by plates 46, and bolts 47. Each of the jack cylinders has a piston 48 working therein and provided with a hydraulic cup packing 49. A piston rod or plunger 50 extends downwardly from the cylinder and is provided on its lower end with a foot 51. Each foot 51 is connected by a tension spring 52 with the jack cylinder header to hold the foot normally raised. A tube 53 surrounds this spring and is fixed at its lower end to the foot 51 to rise and fall therewith. By this means, injury to the spring is prevented.

A branch pipe 54 leads from the pipe 14 to a cylinder 55 having a plunger 56 which bears against the usual clutch lever 57. Should the pump be inadvertently placed in operation while the vehicle is moving, the clutch would be automatically disengaged as a warning to the driver and this action would occur before other parts of the jack would begin to operate.

In operation, the valve 37 is closed. When it is desired to lift both ends of the car both valves 35 are open but if one end only of the car is to be lifted, then only the valve 35 controlling the flow of liquid to that end is open, the other valve being closed. Either the hand or electric operated pump is now operated with the result that fluid under pressure is forced into the jack cylinder at one end or both ends of the automobile as the case may be. This forces the jack feet down to the ground and then lifts the car. At the instant pressure is produced in the pipe 14, the plunger 56 is forced out and the clutch lever moved to release the clutch by the rod 57'. When it is desired to release the jacks, the valve 37 is opened so that the springs 52, assisted at first by the weight of the car, return the jack pistons to normal raised position.

There has thus been provided a simple and efficient device of the kind described and for the purpose specified.

While there is herein shown and described the preferred embodiment of the present invention, it is nevertheless to be understood that minor changes may be made therein without departing from the spirit and scope of the invention as claimed.

Having thus described the invention, what is claimed is:—

1. In a jacking device for automobiles, a pump, a reservoir connected to said pump for supplying liquid thereto, a pipe leading from said pump, hydraulic jacks fixed to the front and rear parts of the automobile, branch pipes leading from the first pipe to the front and rear jacks respectively, control valves in said branch pipes, a clutch lever for controlling movement of the automobile, a cylinder receiving pressure from said pump, and a plunger movable in said cylinder to engage said lever and move the same to clutch releasing position.

2. In an automobile having an engine operatively connected to its wheels through a clutch and having clutch releasing means, a hydraulic jack positioned adjacent each wheel, a pump, a hydraulic cylinder operatively connected to the clutch releasing means and having direct pipe connection with the pump, and pipe connections between said jacks and pump.

3. A safety device for an automobile equipped with a driving engine and driving wheels clutch connected to the engine, the automobile being further equipped with hydraulic jacks and a pump for operating the jacks, said safety device consisting in a clutch releasing device operable to release the clutch upon actuation of the pump.

4. A safety device for an automobile equipped with a driving engine and driving wheels clutch connected to the engine, the automobiles being further equipped with hydraulic jacks and a pump for operating the jacks, said safety device consisting in a clutch releasing device operable to release the clutch upon actuation of the pump and comprising a hydraulic cylinder receiving fluid under pressure is operated, a plunger in the cylinder, and an operative connection between the plunger and clutch.

MATTHEW F. WUEBBEN.
RUDOLPH SCHROEDER.